United States Patent
Takeshita et al.

(10) Patent No.: US 8,771,809 B2
(45) Date of Patent: Jul. 8, 2014

(54) PHOTOALIGNMENT MATERIAL, DISPLAY SUBSTRATE HAVING AN ALIGNMENT LAYER FORMED USING THE SAME, AND METHOD OF MANUFACTURING THE DISPLAY SUBSTRATE

(75) Inventors: Fusayuki Takeshita, Seoul (KR); Jun-Woo Lee, Anyang-si (KR)

(73) Assignee: Samsung Display Co., Ltd., Yongin (KR)

( * ) Notice: Subject to any disclaimer, the term of this patent is extended or adjusted under 35 U.S.C. 154(b) by 972 days.

(21) Appl. No.: 12/391,820

(22) Filed: Feb. 24, 2009

(65) Prior Publication Data

US 2009/0237603 A1 Sep. 24, 2009

(30) Foreign Application Priority Data

Mar. 24, 2008 (KR) ........................ 10-2008-0026898

(51) Int. Cl.
*C09K 19/00* (2006.01)
(52) U.S. Cl.
USPC ............ 428/1.2; 428/1.1; 428/1.25; 428/1.26; 349/123; 349/127; 349/187; 445/58; 528/345
(58) Field of Classification Search
USPC ......... 428/1.2, 1.25, 1.26; 349/123, 127, 187; 252/299.4; 445/58; 528/345
See application file for complete search history.

(56) References Cited

U.S. PATENT DOCUMENTS

| 2004/0026660 A1* | 2/2004 | Vaughan-Spickers et al. ........................ 252/299.01 |
| 2006/0290847 A1* | 12/2006 | Kim ............................. 349/113 |

FOREIGN PATENT DOCUMENTS

| JP | 10-513126 | 12/1998 |
| JP | 2002-014349 | 1/2002 |
| JP | 2004-206091 | 7/2004 |
| JP | 2005-242282 | 9/2005 |
| JP | 2005263772 | 9/2005 |
| JP | 200689432 | 4/2006 |
| JP | 2006215184 | 8/2006 |
| JP | 2007-279691 | 10/2007 |
| JP | 2008-009273 | 1/2008 |
| KR | 1020020042469 | 6/2002 |

OTHER PUBLICATIONS

Machine Translation of JP 2005-263772.*

* cited by examiner

*Primary Examiner* — Gwendolyn Blackwell
*Assistant Examiner* — Ruiyun Zhang
(74) *Attorney, Agent, or Firm* — H.C. Park & Associates, PLC

(57) ABSTRACT

A photoalignment material includes a photoalignment polymer having a photosensitive portion represented by the following Chemical Formula 1, <Chemical Formula 1>

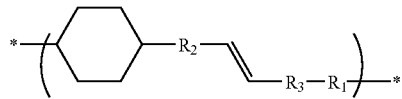

$R_1$ represents a cyclic compound, each of $R_2$ and $R_3$ represents a single bond, $-(C_nH_{2n})-$, $-(C_xH_{2x})O(C_yH_{2y})-$, or $-(C_aH_{2a})O(C_bH_{2b})O(C_dH_{2d})-$, "n" represents an integer in the range of 1 to 6, each of "x", "y", "a", "b", and "d" represents 0 or an integer in the range of 1 to 6, x+y is an integer in the range of 1 to 5, and a+b+d is an integer in the range of 1 to 6. Each hydrogen atom is replaceable with $-CH_3$, $-CH_2-CH_3$, $-OCH_3$, $-OCH_2CH_3$, $-OCH_2OCH_3$, F, or Cl, and each hydrogen atom of $-CH_3$, $-CH_2-CH_3$, $-OCH_3$, $-OCH_2CH_3$, or $-OCH_2OCH_3$ is replaceable with F or Cl.

7 Claims, 3 Drawing Sheets

PHOTOALIGNMENT MATERIAL, DISPLAY SUBSTRATE HAVING AN ALIGNMENT LAYER FORMED USING THE SAME, AND METHOD OF MANUFACTURING THE DISPLAY SUBSTRATE

CROSS-REFERENCE TO RELATED APPLICATION

This application claims priority from and the benefit of Korean Patent Application No. 10-2008-0026898, filed on Mar. 24, 2008, which is hereby incorporated by reference for all purposes as if fully set forth herein.

BACKGROUND OF THE INVENTION

1. Field of the Invention

The present invention relates to a photoalignment material, a display substrate having an alignment layer formed using the same, and a method of manufacturing the display substrate. More particularly, the present invention relates to a photoalignment material used in a process for manufacturing an alignment layer of a liquid crystal display (LCD) apparatus, a display substrate having an alignment layer formed using the same, and a method of manufacturing the display substrate.

2. Background of the Invention

Generally, a liquid crystal display (LCD) panel includes a display substrate having a thin-film transistor (TFT) as a switching device to drive a pixel, an opposite substrate facing the display substrate, and a liquid crystal layer disposed between the display substrate and the opposite substrate. An image is displayed on the LCD panel according to the light transmittance of liquid crystal material, which changes according to voltage.

An alignment layer is formed on interior portions of each of the display substrate and the opposite substrate because it may be difficult to obtain an ideal liquid crystal molecular arrangement by simply disposing the liquid crystal material between the display substrate and the opposite substrate. The alignment layer may be formed by spreading a raw alignment material using a printing roller of an alignment layer printing apparatus on a base substrate and a rubbing process. For example, the raw alignment material may be a solution including a polyimide polymer.

Static electricity may be generated by rubbing with a rubbing cloth during the rubbing process in order to form the alignment layer, and thus the display substrate may be damaged by the static electricity. Moreover, the display substrate may be easily polluted and stained in the rubbing process, so that display quality may decrease. In order to prevent static electricity and improve display quality, a photoalignment process has been developed, wherein the process may include spreading a photoalignment material on the base substrate and photodegrading, photoisomerizing, or photopolymerizing the photoalignment material using light.

An example of the photoalignment material may include a diazo compound, which may be photoisomerized. However, the diazo compound may have low photosensitivity and low alignment stability, and may be decolored to become transparent.

Nowadays, a photoalignment material having a cinnamate, chalcone, or coumarin structure may be used in the photoalignment process using photoisomerization when forming an alignment layer, in order to improve the viewing angle. However, when a chemical compound having this structure is used, a radical reaction or a substitution reaction may be generated in addition to the photoisomerization reaction when light is irradiated because the molecules of the photoalignment material have many pi bonds. In this case, controlling the photoisomerization reaction may be difficult, and thus the reliability of the alignment layer may be decreased.

SUMMARY OF THE INVENTION

The present invention provides a photoalignment material that may have improved structural stability.

The present invention also provides a display substrate having an alignment layer formed using the same.

The present invention also provides a method of manufacturing the display substrate.

Additional features of the invention will be set forth in the description which follows, and in part will be apparent from the description, or may be learned by practice of the invention.

The present invention discloses a photoalignment material including a photoalignment polymer having a photosensitive portion represented by the following Chemical Formula 1.

<Chemical Formula 1>

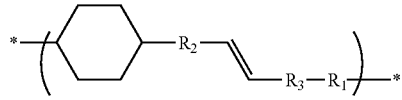

In Chemical Formula 1, $R_1$ represents a cyclic compound. Each of $R_2$ and $R_3$ represents a single bond, $-(C_nH_{2n})-$, $-(C_xH_{2x})O(C_yH_{2y})-$, or $-(C_aH_{2a})O(C_bH_{2b})O(C_dH_{2d})-$, and "n" represents an integer in the range of 1 to 6. Each of "x", "y", "a", "b", and "d" represents 0 or an integer in the range of 1 to 6, x+y is an integer in the range of 1 to 5, and a+b+d is an integer in the range of 1 to 6. Each hydrogen atom may be replaced with $-CH_3$, $-CH_2-CH_3$, $-OCH_3$, $-OCH_2CH_3$, $-OCH_2OCH_3$, F, or Cl, and each hydrogen atom of $-CH_3$, $-CH_2-CH_3$, $-OCH_3$, $-OCH_2CH_3$, or $-OCH_2OCH_3$ may be replaced with F or Cl.

The present invention also discloses a display substrate including a gate line disposed on a base substrate, a data line crossing the gate line, a switching element connected to the gate line and the data line, a pixel electrode electrically connected to the switching element, and an alignment layer disposed on the base substrate. The alignment layer includes a photoalignment polymer having a photosensitive portion represented by Chemical Formula 1.

The present invention also discloses a method of manufacturing the display substrate. A pixel unit is formed on a base substrate. An alignment layer is formed on the base substrate using a photoalignment material including a photoalignment polymer having a photosensitive portion represented by Chemical Formula 1 and an organic solvent. Light is irradiated onto the base substrate having the alignment layer to align a surface of the alignment layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
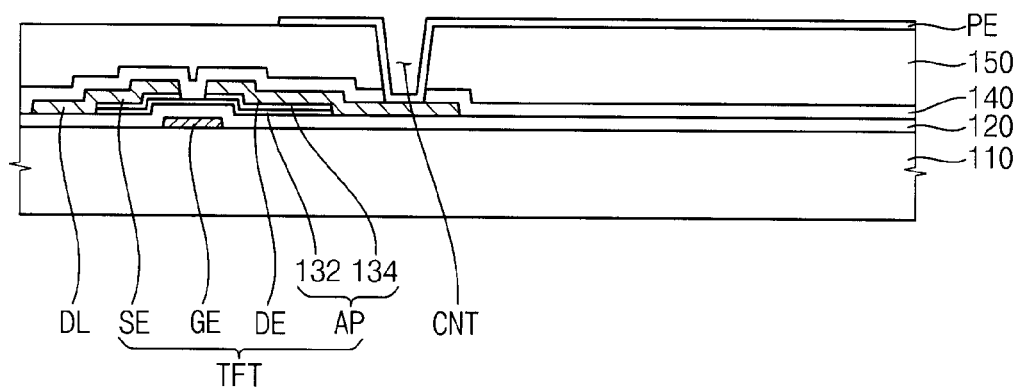
FIG. 1 and FIG. 2 are cross-sectional views showing a method of manufacturing a display substrate according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to," or "coupled to" another element or layer, it can be directly on, connected or coupled to the other element or layer or intervening elements or layers may be present. In contrast, when an element is referred to as being "directly on," "directly connected to," or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer, or section from another region, layer, or section.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the specification and the claims, "—$(C_xH_{2x})$—" may be a linear structure of "—$(CH_2)_x$—" or a branching structure having at least one branch.

Photoalignment Material

A photoalignment material according to an exemplary embodiment of the present invention includes a photoalignment polymer having a photosensitive portion represented by the following Chemical Formula 1.

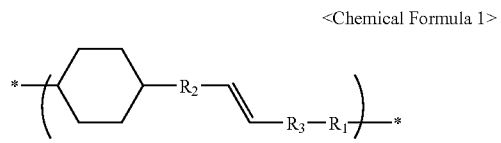

<Chemical Formula 1>

In Chemical Formula 1, $R_1$ represents a cyclic compound, each of $R_2$ and $R_3$ represents a single bond, —$(C_nH_{2n})$—, —$(C_xH_{2x})O(C_yH_{2y})$—, or —$(C_aH_{2a})O(C_bH_{2b})O(C_dH_{2d})$—, and "n" represents an integer in a range the 1 to 6. Each of "x", "y", "a", "b", and "d" represents 0 or an integer in the range of 1 to 6, x+y is an integer in the range of 1 to 5, and a+b+d is an integer in the range of 1 to 6. Each hydrogen atom may be replaced with —$CH_3$, —$CH_2$—$CH_3$, —$OCH_3$, —$OCH_2CH_3$, —$OCH_2OCH_3$, F, or Cl, and each hydrogen atom of —$CH_3$, —$CH_2$—$CH_3$, —$OCH_3$, —$OCH_2CH_3$, or —$OCH_2OCH_3$ may be replaced with F or Cl.

The cyclic compound may be cyclohexane, benzene, chroman, naphthalene, tetrahydropyran, dioxane, or a steroid derivative.

The photosensitive portion may include cyclohexane as the cyclic compound and may be represented by the following Chemical Formula 2.

<Chemical Formula 2>

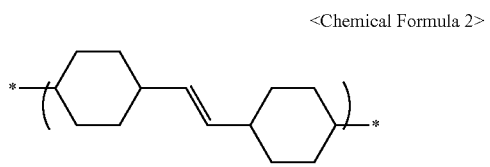

In Chemical Formula 2, each hydrogen atom may be replaced with —$CH_3$, —$CH_2CH_3$, —$OCH_3$, —$OCH_2CH_3$, F, or Cl, and each hydrogen atom of —$CH_3$, —$CH_2CH_3$, —$OCH_3$, or —$OCH_2CH_3$ may be replaced with F or Cl.

In particular, the photosensitive portion may be represented by the following Chemical Formula 3.

<Chemical Formula 3>

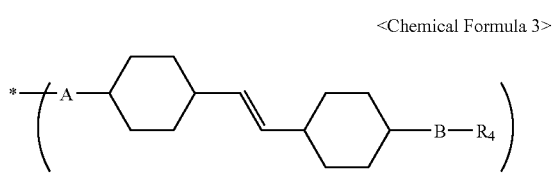

"A" represents —$(C_nH_{2n})$—, "n" represents an integer in the range of 1 to 12, "B" represents a single bond or —$(C_mH_{2m})$—, "m" represents an integer in the range of 1 to 12, at least one of the (—$CH_2$—)'s in each of "A" and "B" may be replaced with

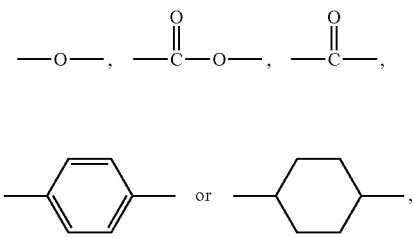

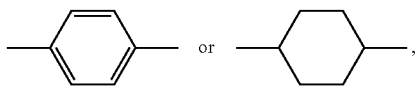

and $R_4$ represents a hydrogen atom or an alkyl group having 1 to 12 carbon atoms. Each hydrogen atom of Chemical Formula 3 may be replaced with F or Cl. $R_4$ may be a portion to generate an alignment character of a surface of an alignment layer formed using the photoalignment material.

Manufacturing of a Photoalignment Polymer

The photoalignment polymer may be prepared by reacting a photoalignment monomer with an acid anhydride. The photoalignment monomer includes the photosensitive portion being represented by Chemical Formula 1.

Examples of a material that may be used for the photoalignment monomer may include compounds represented by the following Chemical Formulas 5 to 40. However, the photoalignment monomer should not be construed as limited to the examples set forth herein.

<Chemical Formula 5>

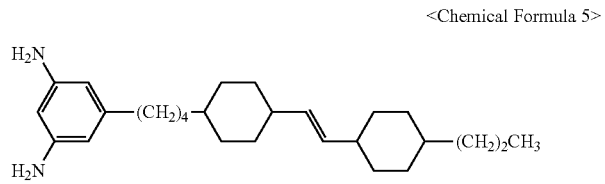

<Chemical Formula 6>

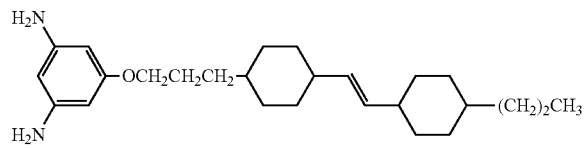

<Chemical Formula 7>

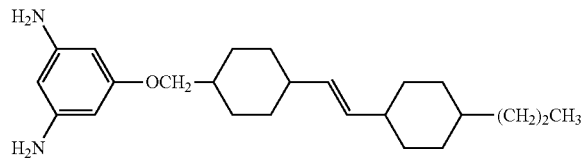

<Chemical Formula 8>

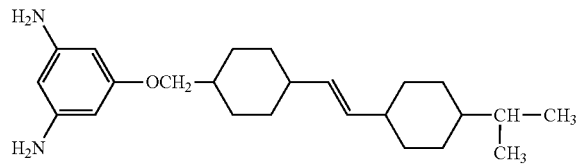

<Chemical Formula 9>

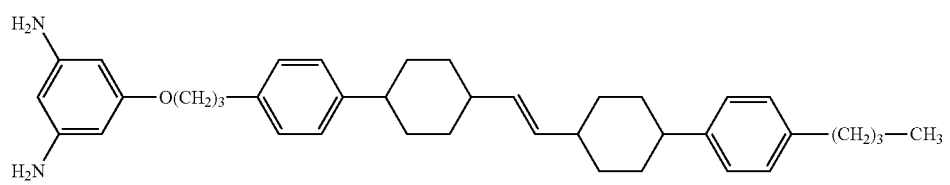

<Chemical Formula 10>

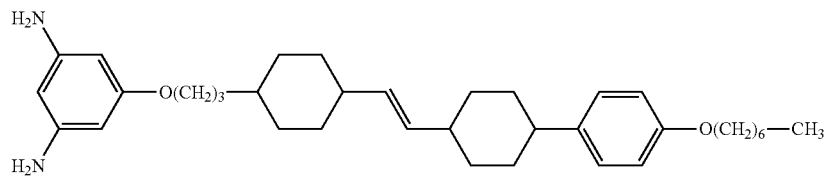

-continued
<Chemical Formula 11>
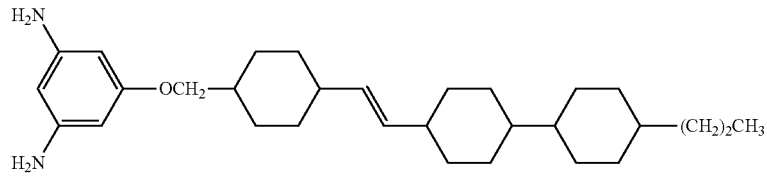
<Chemical Formula 12>
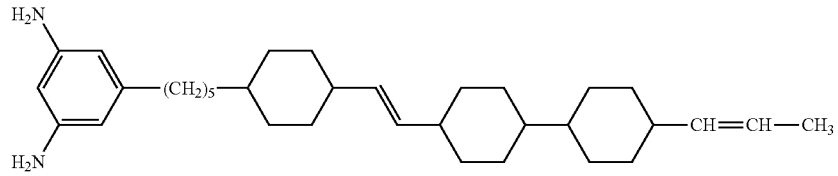
<Chemical Formula 13>
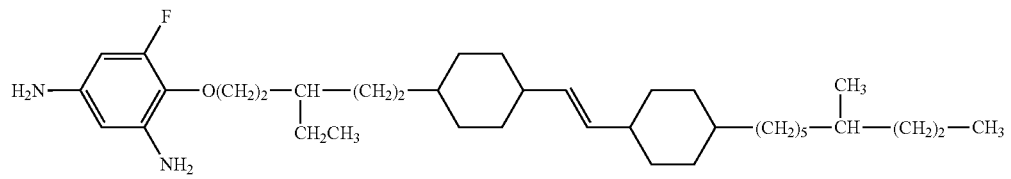
<Chemical Formula 14>
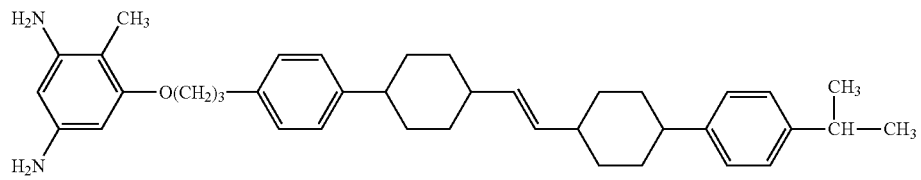
<Chemical Formula 15>
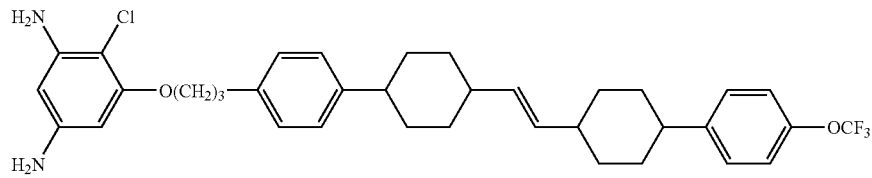
<Chemical Formula 16>
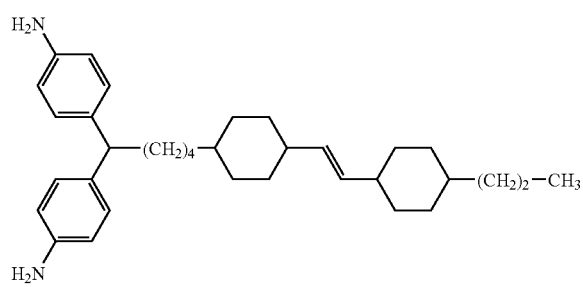
<Chemical Formula 17>
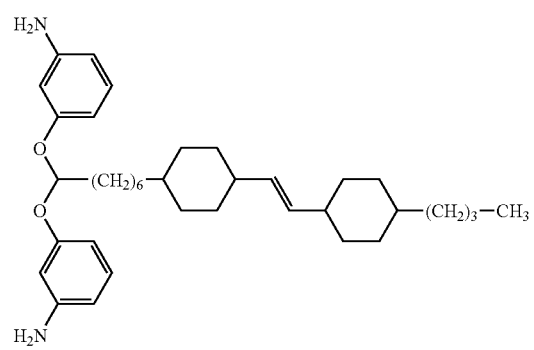

<Chemical Formula 18>
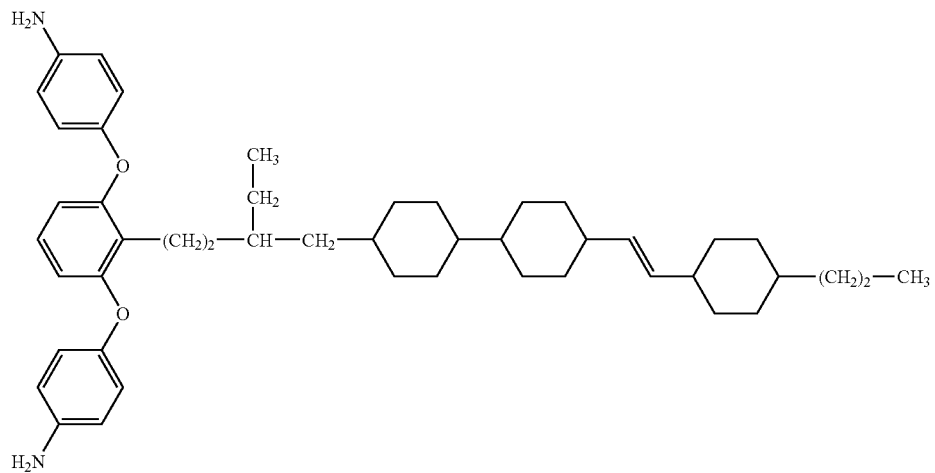
<Chemical Formula 19>
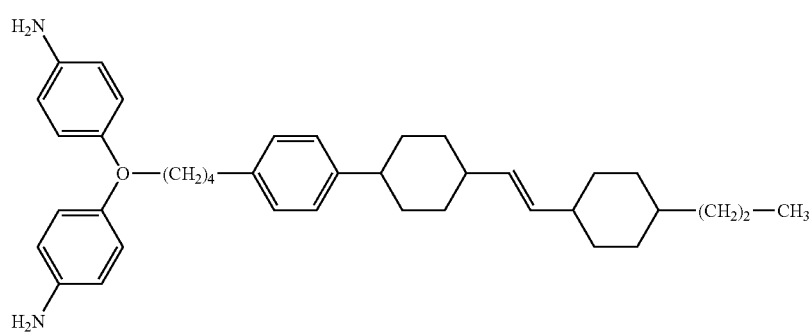
<Chemical Formula 20>
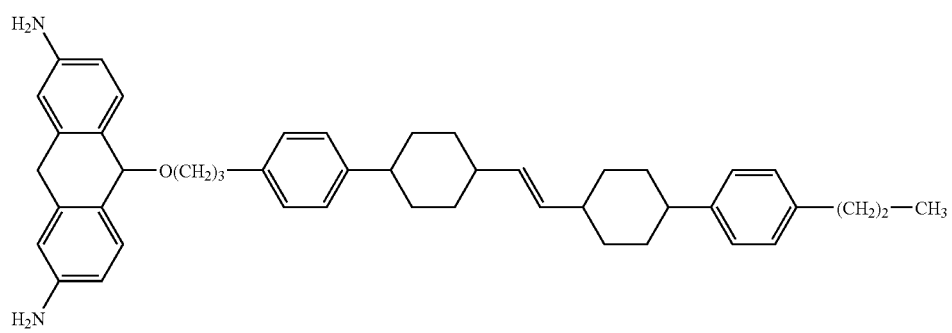
<Chemical Formula 21>
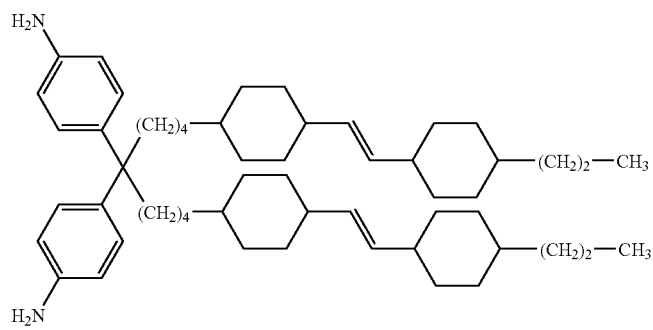

-continued
<Chemical Formula 22>
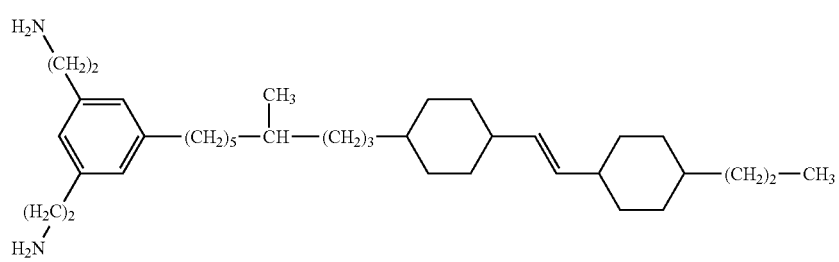
<Chemical Formula 23>
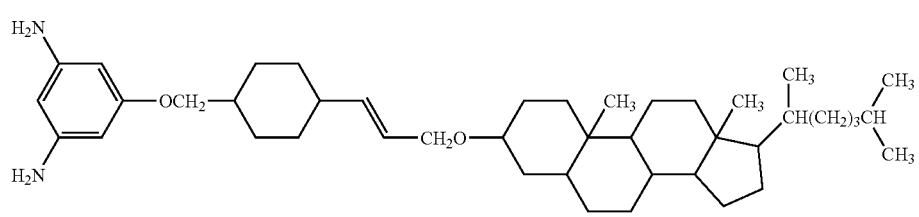
<Chemical Formula 24>
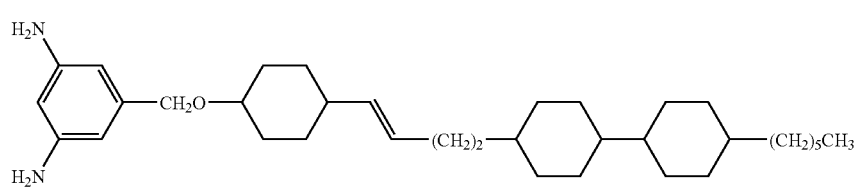
<Chemical Formula 25>
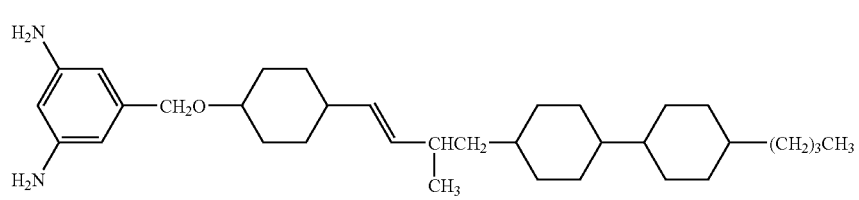
<Chemical Formula 26>
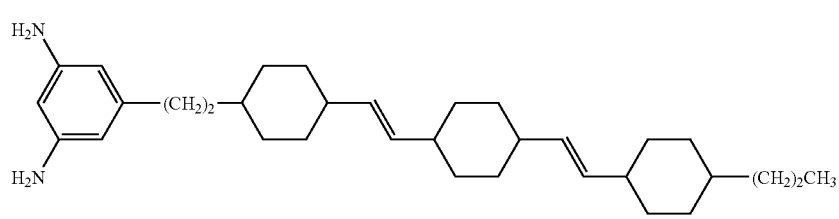
<Chemical Formula 27>
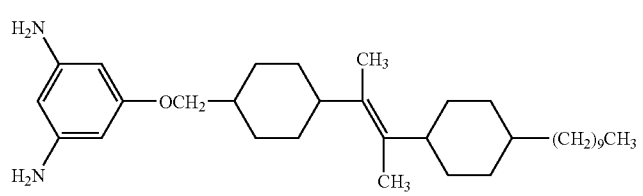
<Chemical Formula 28>
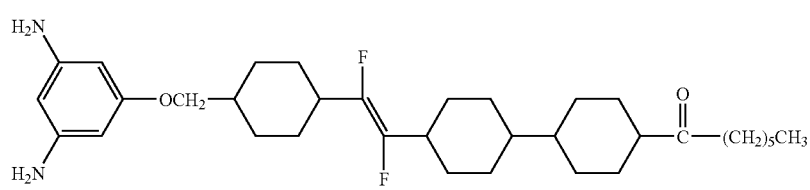
<Chemical Formula 29>
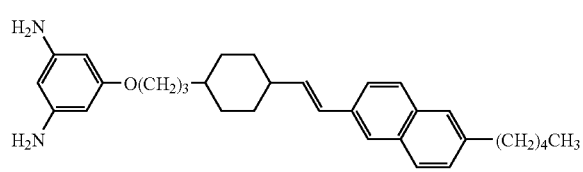
<Chemical Formula 30>
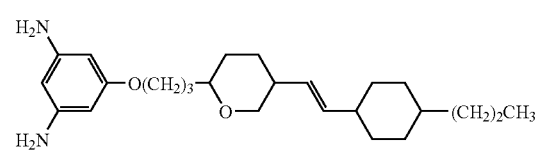

<Chemical Formula 31>
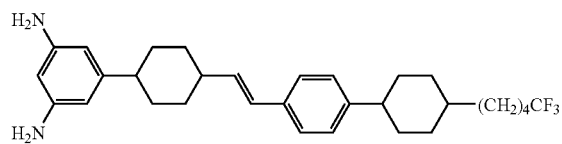
<Chemical Formula 32>
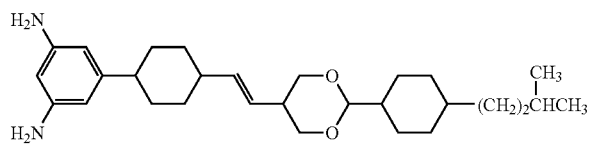
<Chemical Formula 33>
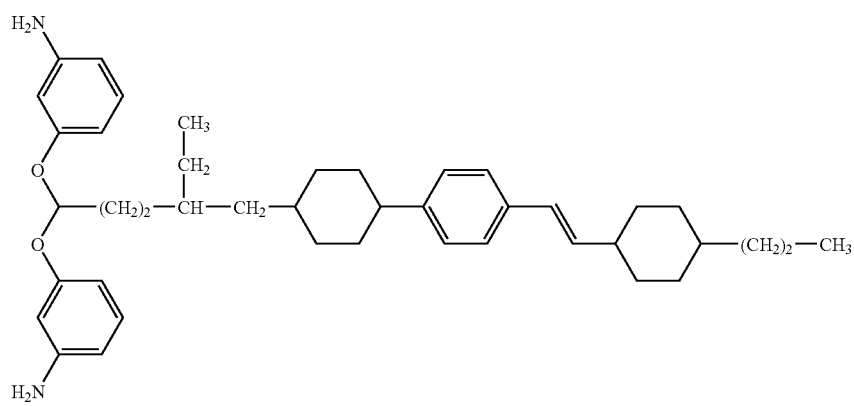
<Chemical Formula 34>
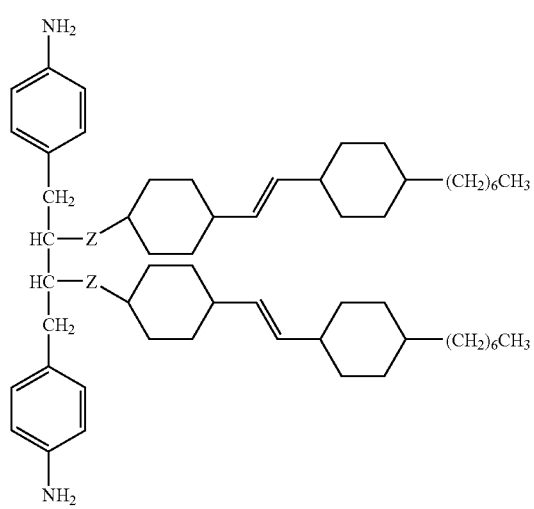
In Chemical Formula 34, "Z" represents a single bond, —O—, —CO—, —COO(CH$_2$)—, —OCO(CH$_2$)—, —C≡C—, or an alkylene group having 1 to 8 carbon atoms. At least one of the (—CH$_2$—)'s in the alkylene group may be replaced with an oxygen atom.
<Chemical Formula 35>
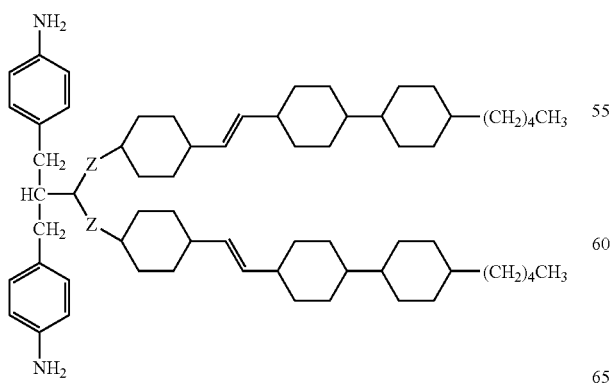

In Chemical Formula 35, "Z" represents a single bond, —O—, —CO—, —COO(CH$_2$)—, —OCO(CH$_2$)—, —C≡C—, or an alkylene group having 1 to 8 carbon atoms. At least one of the (—CH$_2$—)'s in the alkylene group may be replaced with an oxygen atom.

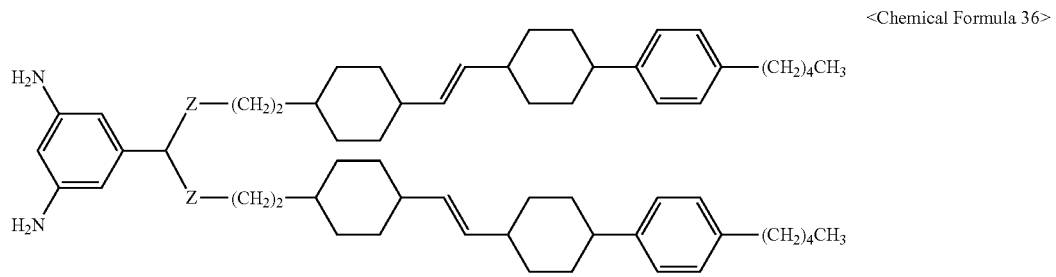

<Chemical Formula 36>

In Chemical Formula 36, "Z" represents a single bond, —O—, —CO—, —COO(CH$_2$)—, —OCO(CH$_2$)—, —C≡C—, or an alkylene group having 1 to 8 carbon atoms. At least one of the (—CH$_2$—)'s in the alkylene group may be replaced with an oxygen atom.

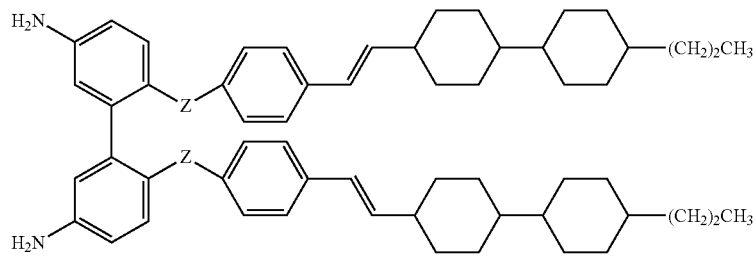

<Chemical Formula 37>

In Chemical Formula 37, "Z" represents a single bond, —O—, —CO—, —COO(CH$_2$)—, —OCO(CH$_2$)—, —C≡C—, or an alkylene group having 1 to 8 carbon atoms. At least one of the (—CH$_2$—)'s in the alkylene group may be replaced with an oxygen atom.

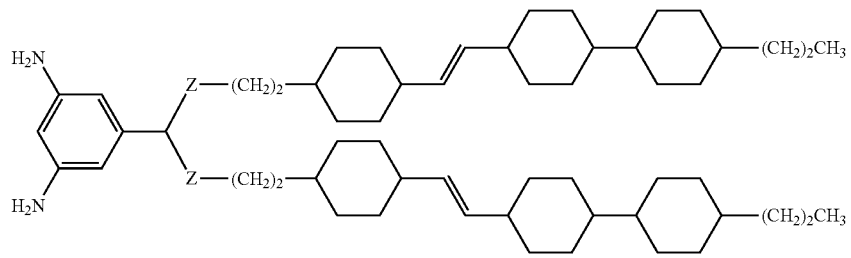

<Chemical Formula 38>

In Chemical Formula 38, "Z" represents a single bond, —O—, —CO—, —COO(CH$_2$)—, —OCO(CH$_2$)—, —C≡C—, or an alkylene group having 1 to 8 carbon atoms. At least one of the (—CH$_2$—)'s in the alkylene group may be replaced with an oxygen atom.

<Chemical Formula 39>

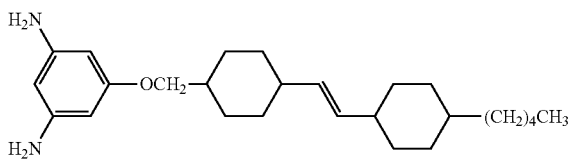

<Chemical Formula 40>

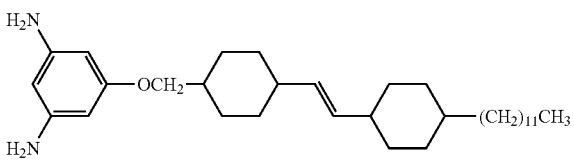

The photoalignment monomer may be prepared by reacting a vinyl compound with a diamine compound. For example, the vinyl compound may be prepared by using a method shown in U.S. Pat. No. 5,055,200 or Japanese Patent Publication No. 2006-89432. In one exemplary embodiment, the synthesis of the vinyl compound and the diamine compound may be performed by the etherification of halogenated phenyldiamine and sodium alcoholate or the addition of diaminophenol at ethane (R—C=C—R').

Examples of a material that may be used for the acid anhydride include compounds represented by the following Chemical Formulas 41 to 52. However, the acid anhydride should not be construed as limited to the examples set forth herein.

<Chemical Formula 41>

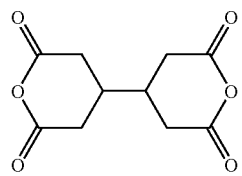

<Chemical Formula 42>

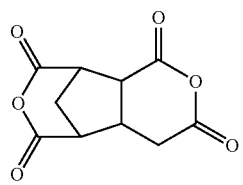

<Chemical Formula 43>

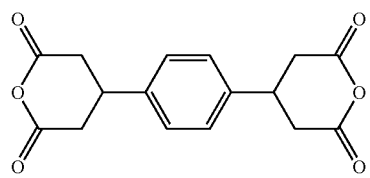

<Chemical Formula 44>

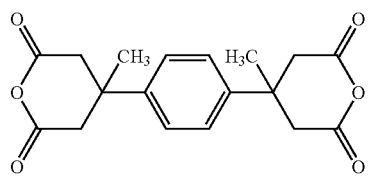

<Chemical Formula 45>

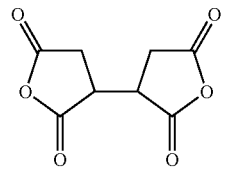

<Chemical Formula 46>

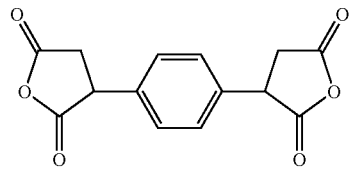

<Chemical Formula 47>

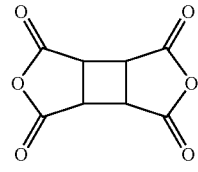

<Chemical Formula 48>

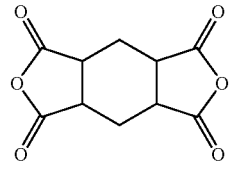

<Chemical Formula 49>

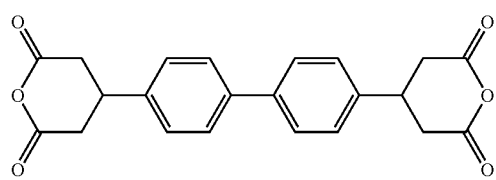

<Chemical Formula 50>

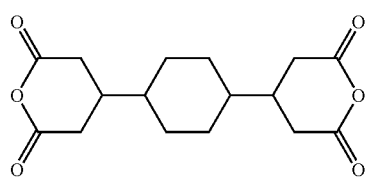

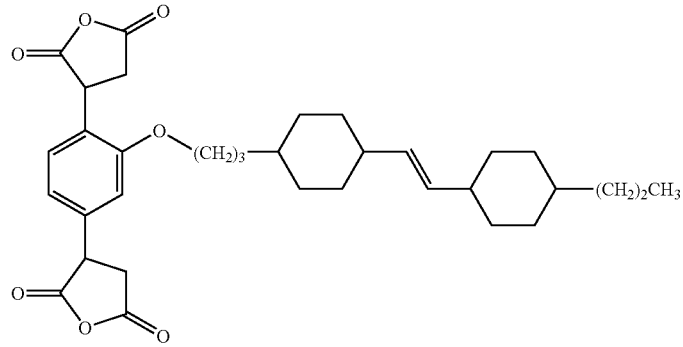

<Chemical Formula 51>

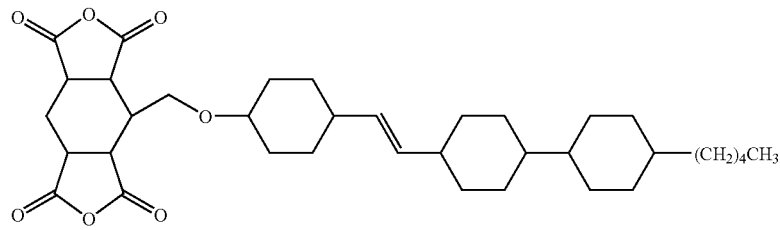

<Chemical Formula 52>

The photosensitive portion includes a carbon-carbon double bond and a cyclohexane bonded to one of the carbons in the double bond. The double bond may be stable due to the cyclohexane and therefore, may not break during a process of forming the photoalignment polymer.

A solution including the photoalignment monomer and the acid anhydride, which is used to form the photoalignment polymer, may further include any of a general diamine compound, an epoxy compound including an epoxy group, an interactive silane compound, and an organic solvent.

Examples of a material that may be used for the general diamine compound may include compounds represented by the following Chemical Formulas 53 to 64. However, the general diamine compound should not be construed as limited to the examples set forth herein.

<Chemical Formula 53>

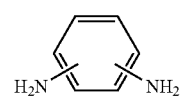

<Chemical Formula 54>

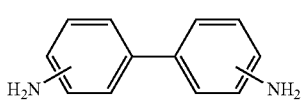

<Chemical Formula 55>

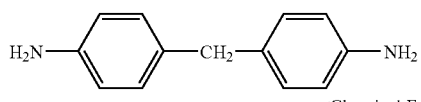

<Chemical Formula 56>

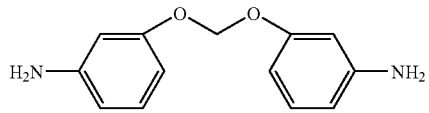

<Chemical Formula 57>

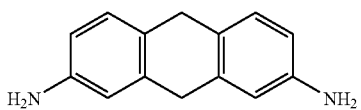

<Chemical Formula 58>

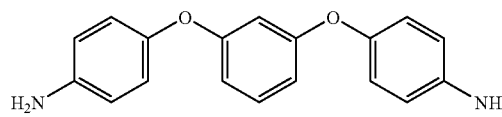

<Chemical Formula 59>

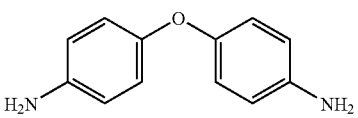

<Chemical Formula 60>

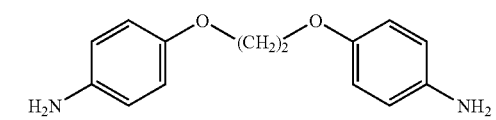

<Chemical Formula 61>

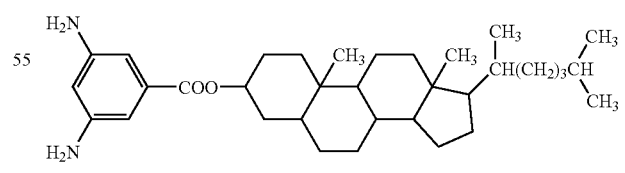

<Chemical Formula 62>

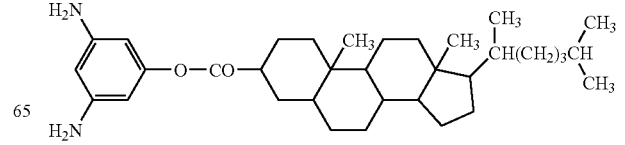

-continued

<Chemical Formula 63>

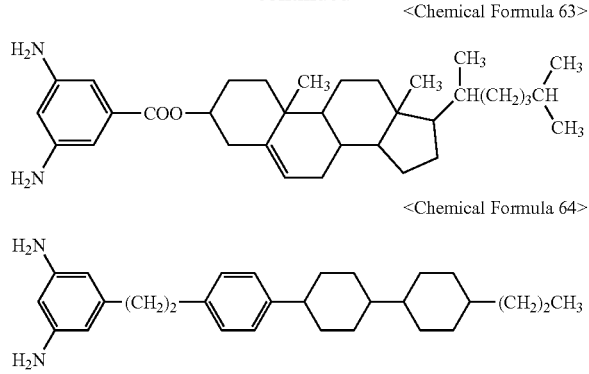

<Chemical Formula 64>

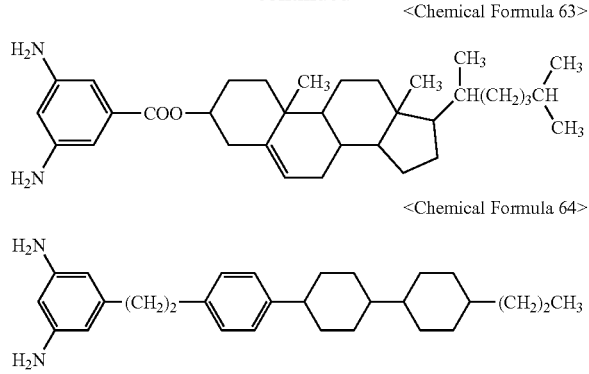

An amino group (—NH$_2$) of the photoalignment monomer may combine with a —CO— of the acid anhydride to form a photoalignment polymer including an imide bond (—NH—CO—) and the photosensitive portion represented by Chemical Formula 41. Moreover, an amino group of the general diamine compound may combine with the acid anhydride to form an imide bond, and the photoalignment monomer may be combined with the general diamine compound.

A reaction of the photoalignment monomer and the acid anhydride may form a polyamic acid, and a partial ring-closure of the polyamic acid may form a polyimide. For example, ring-closure of the polyamic acid may be performed by heating the polyamic acid or by reacting a dehydrating agent and a ring-disclosure catalyst with the polyamic acid. Examples of a material that may be used for the dehydrating agent may include acetic anhydride, trifluoroacetic anhydride, and propionic anhydride. Examples of a material that may be used for the ring-disclosure catalyst may include trimethylamine, pyridine, and collidine.

Examples of a material that may be used for the epoxy compound may include polyethylene glycol diglycidyl ether, 1,6-hexanediol diglycidyl ether, and N,N,N',N'-tetra-glycidyl-diaminodiphenylmethane.

Examples of a material that may be used for the interactive silane compound may include 3-aminopropyltrimethoxysilane and 3-aminopropyltriethoxysilane.

Examples of a material that may be used for the organic solvent may include chlorobenzene, N-methyl pyrrolidone, dimethyl sulfoxide, dimethylformamide, toluene, chloroform, γ-butyrolactone, methyl cellosolve, butyl carbitol, and tetrahydrofurane. These may be used alone or in a combination thereof.

A solid including the photoalignment polymer may be dissolved in the organic solvent. When a content of the solid is less than about 0.1% by weight based on the total weight of the photoalignment material, forming an alignment layer may be very difficult. When the content of the solid is greater than about 20% by weight, the solid may not be easily dissolved in the organic solvent and therefore may form precipitates, which may make it difficult to spread the photoalignment material on a base substrate. Thus, in some exemplary embodiments, the content of the organic solvent may be about 0.1% by weight to about 20% by weight based on a total weight of the photoalignment material.

A weight average molecular weight denotes a polystyrene-reduced weight-average molecular weight being measured by gel permeation chromatography (GPC). When the weight average molecular weight of the photoalignment polymer is less than about 1,000, the properties of polymer may be deteriorated, thereby deteriorating the properties of the alignment layer. When the weight average molecular weight of the photoalignment polymer is greater than about 1,000,000, precipitates may form when the photoalignment material is kept at a lower temperature, and thus it may be difficult to print the photoalignment material on the base substrate. Thus, in some exemplary embodiments, the weight average molecular weight of the photoalignment polymer may be about 10,000 to about 1,000,000.

Example 1

Preparation of a Photoalignment Polymer

About 20 mole equivalents of an anhydride represented by Chemical Formula 42, about 13 mole equivalents of paraphenyldiamine, about 1 mole equivalent of a diamine compound represented by Chemical Formula 61, about 3 mole equivalents of a photoalignment monomer represented by Chemical Formula 7, and about 3 mole equivalents of methyl biphenyldiamine were mixed with dichloromethane, and this solution was slowly stirred while increasing the temperature from about 0° C. to about 100° C. After the reaction, dichloromethane and non-reactive compounds were removed in a decompressed state and dichloromethane was removed in a high-vacuum state, and thus a solid was obtained.

Preparation of a Photoalignment Material

About 6% by weight of the solid was dissolved in about 94% by weight of an organic solvent including about 40 parts by weight of γ-butyrolactone, about 30 parts by weight of N-methyl pyrrolidone, and about 30 parts by weight of butyl cellosolve so as to prepare a photoalignment material according to Example 1.

Example 2

Preparation of a Photoalignment Polymer

About 20 mole equivalents of an anhydride represented by Chemical Formula 42, about 10 mole equivalents of paraphenyldiamine, about 1 mole equivalent of a diamine compound represented by Chemical Formula 61, about 6 mole equivalents of a photoalignment monomer represented by Chemical Formula 11, about 3 mole equivalents of methyl biphenyldiamine, and about 2 mole equivalents of polyethylene glycol diglycidyl ether were mixed with dichloromethane, and this solution was slowly stirred while increasing the temperature from about 0° C. to about 100° C. After the reaction, dichloromethane and non-reactive compounds were removed in a decompressed state and dichloromethane was removed in a high-vacuum state, and thus a solid was obtained. A weight average molecular weight of the photoalignment of the solid was about 80,000.

Preparation of a Photoalignment Material

About 5% by weight of the solid was dissolved in about 95% by weight of an organic solvent including about 40 parts by weight of γ-butyrolactone, about 30 parts by weight of N-methyl pyrrolidone, and about 30 parts by weight of butyl cellosolve so as to prepare a photoalignment material according to Example 2.

Example 3

Preparation of a Photoalignment Polymer

About 20 mole equivalents of an anhydride represented by Chemical Formula 42, about 13 mole equivalents of paraphenyldiamine, about 1 mole equivalent of a diamine compound represented by Chemical Formula 61, about 3 mole equivalents of a photoalignment monomer represented by Chemical Formula 9 and about 3 mole equivalents of methyl biphenyldiamine were mixed with dichloromethane, and this solution was slowly stirred while increasing the temperature from about 0° C. to about 100° C. After the reaction, dichloromethane and non-reactive compounds were removed in a decompressed state and dichloromethane was removed in a high-vacuum state, and thus a solid was obtained.

Preparation of a Photoalignment Material

About 4% by weight of the solid was dissolved in about 96% by weight of an organic solvent including about 40 parts by weight of γ-butyrolactone, about 30 parts by weight of N-methyl pyrrolidone, and about 30 parts by weight of butyl cellosolve so as to prepare a photoalignment material according to Example 3.

Example 4

Preparation of a Photoalignment Polymer

About 15 mole equivalents of an anhydride represented by Chemical Formula 42, about 5 mole equivalents of an acid anhydride represented by Chemical Formula 43, about 11 mole equivalents of paraphenyldiamine, about 4 mole equivalents of a diamine compound represented by Chemical Formula 62, about 3 mole equivalents of a photoalignment monomer represented by Chemical Formula 11 and about 2 mole equivalents of methyl biphenyldiamine were mixed with dichloromethane, and this solution was slowly stirred while increasing the temperature from about 0° C. to about 100° C. After the reaction, dichloromethane and non-reactive compounds were removed in a decompressed state and dichloromethane was removed in a high-vacuum state, and thus a solid was obtained.

Preparation of a Photoalignment Material

About 5% by weight of the solid was dissolved in about 95% by weight of an organic solvent including about 40 parts by weight of γ-butyrolactone, about 30 parts by weight of N-methyl pyrrolidone, and about 30 parts by weight of butyl cellosolve so as to prepare a photoalignment material according to Example 4.

Example 5

Preparation of a Photoalignment Polymer

About 15 mole equivalents of an anhydride represented by Chemical Formula 42, about 5 mole equivalents of an acid anhydride represented by Chemical Formula 43, about 11 mole equivalents of paraphenyldiamine, and about 10 mole equivalents of a photoalignment monomer represented by Chemical Formula 11 were mixed with dichloromethane, and this solution was slowly stirred while increasing the temperature from about 0° C. to about 100° C. After the reaction, dichloromethane and non-reactive compounds were removed in a decompressed state and dichloromethane was removed in a high-vacuum state, and thus a solid was obtained.

Preparation of a Photoalignment Material

About 7% by weight of the solid was dissolved in about 93% by weight of an organic solvent including about 60 parts by weight of N-methyl pyrrolidone and about 60 parts by weight of butyl cellosolve so as to prepare a photoalignment material according to Example 5.

Comparative Example 1

A photoalignment material of JSR Corporation (company name, Japan), being a vertical alignment type, being disclosed in Japanese Patent Publication No. 2003-0019247, using about 20 mole equivalents of an acid anhydride represented by Chemical Formula 42 and a diamine compound represented by Chemical Formula 62 was prepared.

Comparative Example 2

Poly-(vinyl methoxy cinnamate) of Rolic Technologies Ltd. (company name, Switzerland) as photoalignment material was prepared.

Evaluation of an Alignment Layer

Each photoalignment material according to Examples 1 and 2 and Comparative Example 1 was spread on a 17-inch display substrate, and pre-baked at about 60° C. After being pre-baked, the photoalignment materials disposed on the display substrate were cured at about 200° C. for about 10 minutes. After curing, the photoalignment materials disposed on the display substrate were irradiated by about 1 J/cm$^2$ the UV rays in the anti-parallel direction in the UV exposure apparatus of Ushio Inc. (company name, Japan). The UV rays were about 40° plane-polarized UV when about 0° was defined a direction parallel to a surface of the display substrate. Additionally, a display panel was manufactured using the display substrate and vertical alignment type liquid crystals of Merck KGaA (company name, Germany) being mass-producing in the present.

According to the Example 1, liquid crystals had a pretilt angle of about 89.0°, and the display panel displayed a fine image without spots or stains. A checker flag pattern disappeared after the display panel was maintained at about 50° C. for about 24 hours, an evaluation of afterimages was performed and the display panel did not have line afterimages and surface afterimages. The response time was about 8.0 ms, and the contrast ratio was about 2,250.

According to the Example 2, liquid crystals had a pretilt angle of about 88.5°, and the display panel displayed a fine image without spots or stains. In the evaluation of afterimages, the display panel did not have line afterimages and surface afterimages. The response time was about 7.0 ms and the contrast ratio was about 1,900.

According to the Comparative Example 1, liquid crystals had a pretilt angle of about 89.0°, and the display panel displayed a fine image without spots or stains. In the evaluation of afterimages, the display panel did not have line afterimages and surface afterimages, and the contrast ratio was about 2,390. However, the response time was about 7.0 ms, which is remarkably slower than the response time of the Examples 1 and 2.

The photoalignment material according to the Comparative Example 2 was spread on a 17-inch display substrate, and pre-baked at about 60° C. After being pre-baked, the photoalignment materials disposed on the display substrate were cured at about 200° C. for about 10 minutes. After curing, the photoalignment material disposed on the display substrate was irradiated by about 0.1 J/cm$^2$ the UV rays in the anti-parallel direction in the UV exposure apparatus of Ushio Inc. (company name, Japan). The UV rays were about 40° plane-polarized UV when about 0° was defined as a direction parallel to a surface of the display substrate. Additionally, a display panel was manufactured using the display substrate and vertical alignment type liquid crystals of Merck KGaA (company name, Germany) being mass-producing in the present. According to the Comparative Example 2, liquid crystals had a pretilt angle of about 88.9° using relatively lower energy, the response time was about 8.0 ms, and the contrast ratio was about 2,200. However, the display panel displayed surface afterimages even after the voltage was raised to about 9.2 V.

The photoalignment material according to the Example 3 was spread on an approximately 5 inch display substrate, the photoalignment material according to the Example 4 was spread on an approximately 32 inch display substrate, and the photoalignment material according to the Example 5 was spread on an approximately 5 inch display substrate. Each photoalignment material was pre-baked in about 60° C. After being pre-baked, the photoalignment materials disposed on the display substrate were cured in about 200° C. for about 10 minutes. After curing, the photoalignment materials disposed on the display substrate ware irradiated by about 2 J/cm$^2$ the UV rays in the anti-parallel direction in the UV exposure apparatus of Ushio Inc. (company name, Japan). The UV rays were about 40° plane-polarized UV when about 0° was defined a direction perpendicular to a surface of the display substrate. Additionally, a display panel was manufactured using the display substrate and vertical alignment type liquid crystals of Merck KGaA (company name, Germany) being mass-producing in the present.

According to the Example 3, a VHR (Voltage Holding ratio) was about 99.0% in about 60° C., and the display panel did not have line afterimages and surface afterimages in the evaluation of afterimages. The response time was about 7.8 ms when the cell gap in the display panel was about 3.7 μm, which is relatively faster than the response time of the Example 1.

According to the Example 4, liquid crystals had a pretilt angle of about 89.1°, and the display panel did not have line afterimages and surface afterimages in the evaluation of afterimages. The response time was about 7.5 ms and the transmittance of the display panel was improved.

According to the Example 5, liquid crystals had a pretilt angle about 88.0°, the display panel did not have line afterimages and surface afterimages in the evaluation of afterimages, and the viewing angle was improved.

Method of Manufacturing a Display Substrate

Hereafter, a method of manufacturing a display substrate having an alignment layer formed using the photoalignment material will be fully described referring to FIG. 1, FIG. 2, FIG. 3, and FIG. 4.

Figure 2:
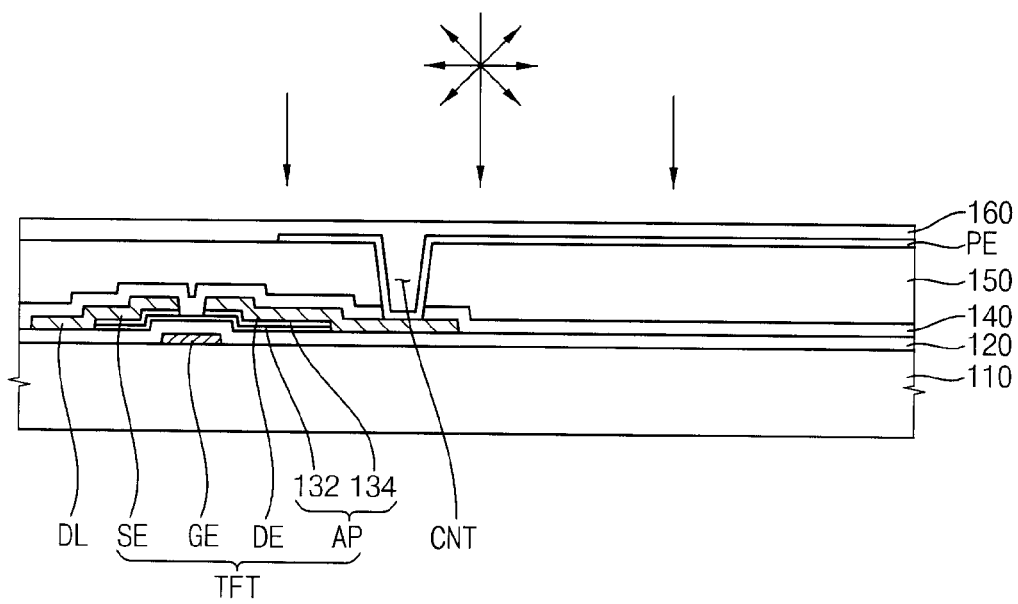

FIG. 1 and FIG. 2 are cross-sectional views showing a method of manufacturing a display substrate according to an exemplary embodiment of the present invention.

Referring to FIG. 1, a pixel unit is formed on a first base substrate 110. The pixel unit formed on the first base substrate 110 includes a gate line (not shown), a data line DL, a switching element TFT connected to the gate line and the data line DL, a gate insulation layer 120, a passivation layer 140, an organic layer 150, and a pixel electrode PE.

In particular, a gate metal layer is formed on the first base substrate 110, and the gate metal layer is patterned by a photolithography process to form the gate line and a gate electrode GE connected to the gate line.

The gate insulation layer 120 and an active pattern AP are formed on the first base substrate 110 having the gate line and the gate electrode GE. In one exemplary embodiment, the active pattern AP may include a semiconductor layer 132 including amorphous silicon and an ohmic contact layer 134 including amorphous silicon into which n$^+$ impurities are implanted at a high concentration. The ohmic contact layer 134 is formed on the semiconductor layer 132.

A data metal layer (not shown) is formed on the first base substrate 110 having the active pattern AP, and the data metal layer is patterned by a photolithography process to form the data line DL, a source electrode SE connected to the data line DL, and a drain electrode DE spaced apart from the source electrode SE. The switching element TFT includes the gate electrode GE, the source electrode SE, and the drain electrode DE.

The passivation layer 140 and the organic layer 150 are formed on the first base substrate 110 having the data line DL, the source electrode SE, and the drain electrode DE. The passivation layer 140 and the organic layer 150 on the drain electrode DE are removed to form a contact hole CNT in the passivation layer 140 and the organic layer 150. The contact hole CNT exposes a portion of the drain electrode DE.

The pixel electrode PE is formed on the first base substrate 110 having the passivation layer 140 and the organic layer 150 including the contact hole CNT. The pixel electrode PE is connected to the switching element TFT through the contact hole CNT.

Referring to FIG. 2, a first photoalignment material layer (not shown) is formed by spreading a photoalignment material on the first base substrate 110 having the pixel unit.

The photoalignment material includes the photoalignment polymer including the photosensitive portion represented by Chemical Formula 1. The photoalignment material used in manufacturing a display substrate is substantially the same material as the exemplary embodiment of the present invention previously described above. Thus, any further description will be omitted.

The first photoalignment material layer is pre-baked at a temperature in a range of about 50° C. to about 70° C. and hard-baked at a temperature in a range of about 180° C. to about 220° C. after being pre-baked. The first photoalignment material layer is irradiated by polarized UV light, and thus a chain end portion of the photoalignment polymer is arranged by the polarized UV light, the chain end portion having an angle based on a surface of the first base substrate 110. Thus, a first alignment layer 160 is formed on the first base substrate 110 having the pixel unit. In some exemplary embodiments, the energy of the polarized UV light may be in the range of about 0.5 J/cm$^2$ to about 2 J/cm$^2$ and the angle may be in the range of about 87° to about 90° based on a surface of the first base substrate 110.

Figure 3:
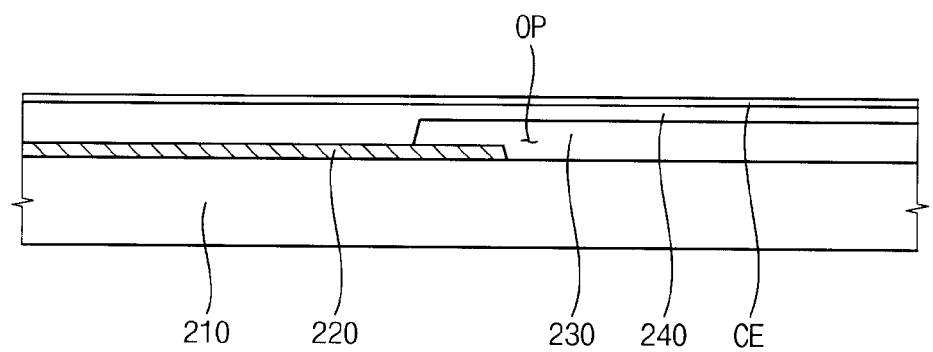
FIG. 3 and FIG. 4 are cross-sectional views showing a method of manufacturing a display substrate according to another exemplary embodiment of the present invention.
Figure 4:
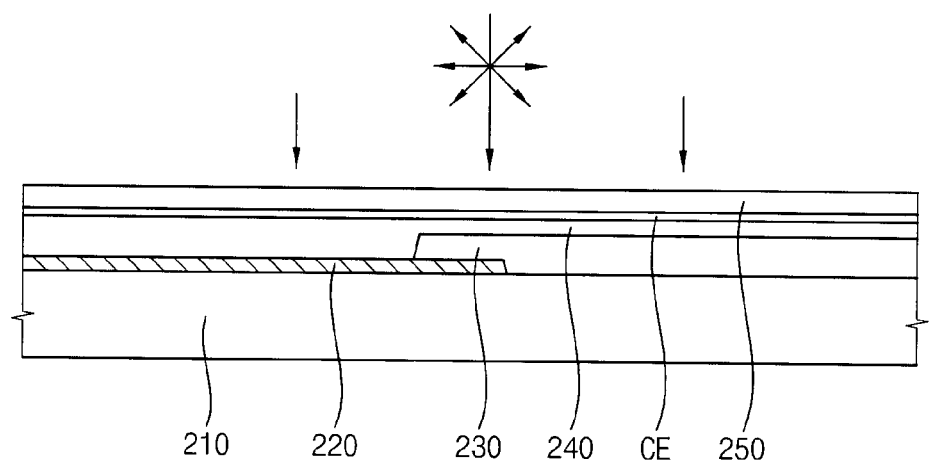

FIG. 3 and FIG. 4 are cross-sectional views showing a method of manufacturing a display substrate according to another exemplary embodiment of the present invention.

Referring to FIG. 3, a pixel unit is formed on a second base substrate 210. The pixel unit formed on the second base substrate 210 includes a black matrix pattern 220, a color filter 230, an over-coating layer 240, and a common electrode CE.

In particular, a light-blocking layer (not shown) is formed on the second base substrate 210, and the light-blocking layer is patterned by a photolithography process to form the black matrix pattern 220. The black matrix pattern 220 may include an opening portion OP exposing the second base substrate 210.

The color filter 230 is formed in the opening portion of the black matrix pattern 220. For example, a color photoresist layer (not shown) may be formed on the second base substrate 210 having the black matrix pattern 220, and the color photoresist layer may be patterned by a photolithography process to form the color filter 230. In some exemplary embodiments, the color filter 230 may be formed by jetting a color ink in the opening portion OP.

The over-coating layer 240 and the common electrode CE are formed on the second base substrate 210 having the color filter 230.

Referring to FIG. 4, a second photoalignment material layer (not shown) is formed by spreading a photoalignment material on the second base substrate 210 having the common electrode CE.

The second photoalignment material layer is irradiated by polarized UV light, and thus a second alignment layer 250 is formed on the second base substrate 210 having the pixel unit. The second alignment layer 250 may be formed by substantially the same processes as the first alignment layer 160, which were described above. Thus, any further description will be omitted.

Figure 5:
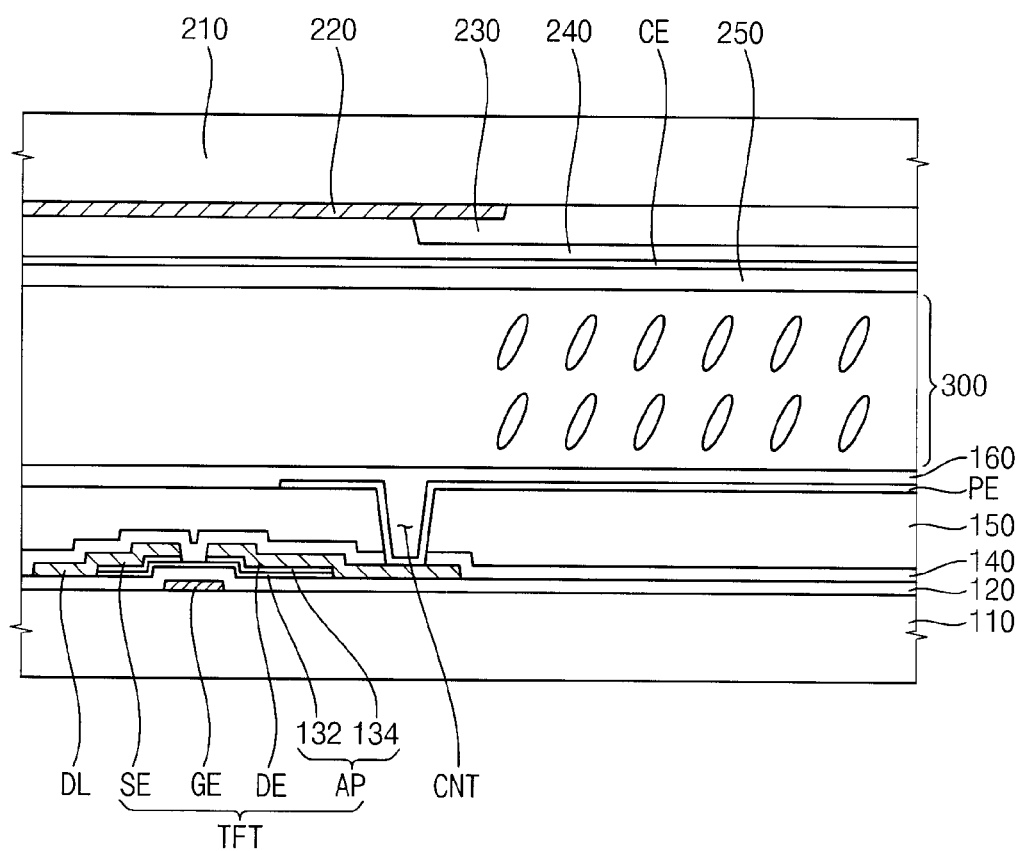
FIG. 5 is a cross-sectional view showing a display panel having the display substrate of FIG. 2 and the display substrate of FIG. 4.

FIG. 5 is a cross-sectional view showing a display panel having the display substrate of FIG. 2 and the display substrate of FIG. 4.

Referring to FIG. 5, a display panel includes the first base substrate 110 having the first alignment layer 160, the second base substrate 210 having the second alignment layer 250, and a liquid crystal layer 300 disposed between the first base substrate 110 and the second base substrate 210.

In particular, liquid crystal molecules of the liquid crystal layer 300 are disposed between the first alignment layer 160 and the second alignment layer 250. The alignment of the liquid crystal molecules may be changed by the electric field between the pixel electrode PE and the common electrode CE.

According to the photoalignment material, a display substrate having an alignment layer formed using the same, and a method of manufacturing the display substrate, a photoalignment polymer has a carbon-carbon double bond and a cyclohexane bonded to one of the carbons in the double bond so as to be structurally stabilize the double bond. Thereafter, the reliability of forming a photoalignment polymer, the alignment reliability by photoisomerization, and display quality may be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A photoalignment material, comprising:
a photoalignment polymer having a photosensitive portion, the photosensitive portion represented by the following Chemical Formula 1, <Chemical Formula 1>

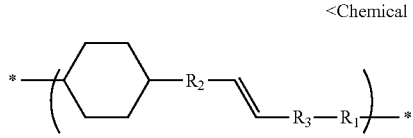

wherein $R_1$ represents a cyclic compound, each of $R_2$ and $R_3$ represents a single bond, $-(C_nH_{2n})-$, $-(C_xH_{2x})O(C_yH_{2y})-$, or $-(C_aH_{2a})O(C_bH_{2b})O(C_dH_{2d})-$, "n" represents an integer in the range of 1 to 6, each of "x", "y", "a", "b" and "d" represents 0 or an integer in the range of 1 to 6, x+y is an integer in the range of 1 to 5, a+b+d is an integer in the range of 1 to 6, each hydrogen atom is replaceable with $-CH_3$, $-CH_2-CH_3$, $-OCH_3$, $-OCH_2CH_3$, $-OCH_2OCH_3$, F, or Cl, and each hydrogen atom of $-CH_3$, $-CH_2-CH_3$, $-OCH_3$, $-OCH_2CH_3$, or $-OCH_2OCH_3$ is replaceable with F or Cl, wherein the photoalignment polymer is formed by reacting a compound represented by the following Chemical Formula 4 with an acid anhydride, <Chemical Formula 4>

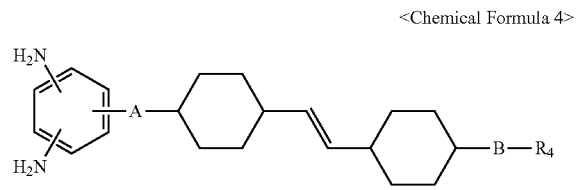

wherein "A" represents $-(C_nH_{2n})-$, "n" represents an integer in the range of 1 to 12, "B" represents a single bond or $-(C_mH_{2m})-$, "m" represents an integer in the range of 1 to 12, at least one of the ($-CH_2-$)'s in each of "A" and "B" is replaceable with

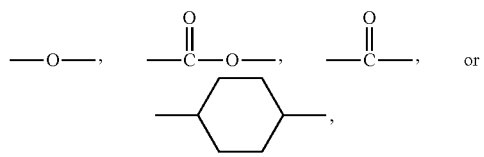

and $R_4$ represents a hydrogen atom or an alkyl group having 1 to 12 carbon atoms, and each hydrogen atom of Chemical Formula 4 except the hydrogen atoms of $-NH_2$ is replaceable with F or Cl.

2. The photoalignment material of claim 1, wherein the cyclic compound comprises one selected from the group consisting of cyclohexane, benzene, chroman, naphthalene, tetrahydropyran, dioxane, and a steroid derivative.

3. The photoalignment material of claim 1, wherein the photosensitive portion is represented by the following Chemical Formula 2, <Chemical Formula 2>

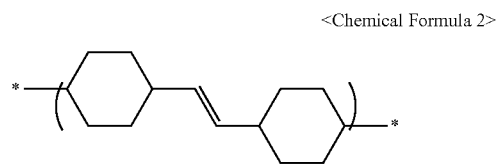

wherein each hydrogen atom is replaceable with $-CH_3$, $-CH_2CH_3$, $-OCH_3$, $-OCH_2CH_3$, F, or Cl and each of hydrogen atoms of $-CH_3$, $-CH_2CH_3$, $-OCH_3$, or $-OCH_2CH_3$ is replaceable with F or Cl.

4. The photoalignment material of claim 1, wherein the photoalignment polymer comprises at least one selected from the group consisting of a polyamic acid having the photosensitive portion represented by Chemical Formula 1 and a polyimide having the photosensitive portion represented by Chemical Formula 1.

5. The photoalignment material of claim 1, further comprising an organic solvent comprising at least one selected from the group consisting of chlorobenzene, N-methyl pyrrolidone, dimethyl sulfoxide, dimethylformamide, toluene, chloroform, γ-butyrolactone, methyl cellosolve, butyl carbitol, and tetrahydrofurane.

6. A display substrate, comprising:
a gate line disposed on a base substrate;
a data line crossing the gate line;

a switching element connected to the gate line and the data line;
a pixel electrode connected to the switching element; and
an alignment layer disposed on the base substrate, the alignment layer comprising a photosensitive portion, the photosensitive portion represented by the following Chemical Formula 1, <Chemical Formula 1>

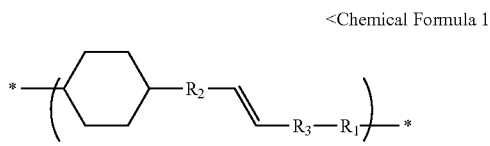

wherein $R_1$ represents cyclohexane, benzene, chroman, naphthalene, tetrahydropyran, dioxane, or a steroid derivative, each of $R_2$ and $R_3$ represents a single bond, $-(C_nH_{2n})-$, $-(C_xH_{2x})O(C_yH_{2y})-$, or $-(C_aH_{2a})O(C_bH_{2b})O(C_dH_{2d})-$, "n" represents an integer in the range of 1 to 6, each of "x", "y", "a", "b", and "d" represents 0 or an integer in the range of 1 to 6, x+y is an integer in the range of 1 to 5, a+b+d is an integer in the range of 1 to 6, each hydrogen atom is replaceable with $-CH_3$, $-CH_2-CH_3$, $-OCH_3$, $-OCH_2CH_3$, $-OCH_2OCH_3$, F, or Cl, and each hydrogen atom of $-CH_3$, $-CH_2-CH_3$, $-OCH_3$, $-OCH_2CH_3$, or $-OCH_2OCH_3$ is replaceable with F or Cl,
wherein the photoalignment polymer is formed by reacting a compound represented by the following Chemical Formula 4 with an acid anhydride, <Chemical Formula 4>

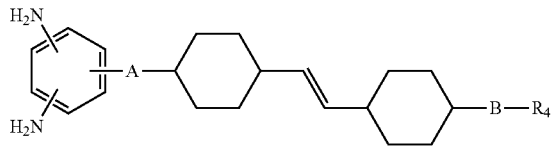

wherein "A" represents $-(C_nH_{2n})-$, "n" represents an integer in the range of 1 to 12, "B" represents a single bond or $-(C_mH_{2m})-$, "m" represents an integer in the range of 1 to 12, at least one of the ($-CH_2-$)'s in each of "A" and "B" is replaceable with

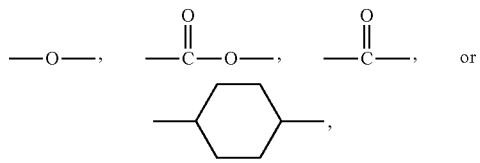

and $R_4$ represents a hydrogen atom or an alkyl group having 1 to 12 carbon atoms, and each hydrogen atom of Chemical Formula 4 except the hydrogen atoms of $-NH_2$ is replaceable with F or Cl.

7. The display substrate of claim 6, wherein the photosensitive portion is represented by the following Chemical Formula 2, <Chemical Formula 2>

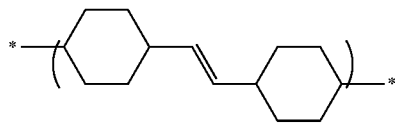

wherein each hydrogen atom is replaceable with $-CH_3$, $-CH_2CH_3$, $-OCH_3$, $-OCH_2CH_3$, F, or Cl, and each hydrogen atom of $-CH_3$, $-CH_2CH_3$, $-OCH_3$, or $-OCH_2CH_3$ is replaceable with F or Cl.

* * * * *